Patented Aug. 23, 1932

1,873,210

UNITED STATES PATENT OFFICE

JOHN E. MORROW, OF OAKMONT, PENNSYLVANIA, ASSIGNOR TO ALUMINUM COMPANY OF AMERICA, OF PITTSBURGH, PENNSYLVANIA, A CORPORATION OF PENNSYLVANIA

PRODUCTION OF SODIUM ALUMINUM FLUORIDES

No Drawing.   Application filed December 30, 1927.  Serial No. 243,758.

This invention relates to the production of sodium aluminum fluorides of a high degree of purity from sodium fluoride and aluminum hydrate. The object of the invention is to provide a simple and commercially feasible method of producing an artificial cryolite which has approximately the same chemical composition as the natural mineral cryolite, and which may be used for the same purposes.

Double fluorides of sodium and aluminum occur in nature as the minerals cryolite ($Na_3AlF_6$ or $3NaF.AlF_3$) and chiolite, the formula of which is reported to be $5NaF.3AlF_3$. For most purposes for which cryolite is used, either of these minerals or a mixture of them can be employed. The product of my process has a composition approximating $Na_3AlF_6$. The product may, however, under some conditions, contain sodium fluoride and aluminum fluoride in a somewhat different ratio than that found in the mineral cryolite and therefore, I prefer to describe the product by the general term "sodium aluminum fluoride."

I have discovered that by digesting together suitable amounts of sodium fluoride and aluminum hydrate there is obtained sodium aluminum fluoride of high purity. I have further discovered that a suitable treatment of the digested solution will enable the recovery of the sodium aluminum fluoride in amounts as high as 90 to 95% of the theoretical yield.

According to my invention sodium fluoride and aluminum hydrate mixed with water are caused to react at temperatures of about 75° C. or above to form a sodium aluminum fluoride and sodium hydroxide, apparently according to the reaction

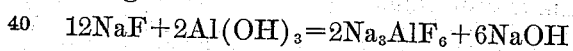

It is not essential to the success of the reaction that the reagents be pure, in fact, sodium aluminum fluoride may be satisfactorily formed by using impure sodium fluoride and bauxite. However, the purity of the product is dependent upon the purity of the reacting materials and for this reason it is preferable to use a sodium fluoride of high purity and an aluminum hydrate of a purity comparable to that produced by the well known Bayer process.

The sodium fluoride and aluminum hydrate may be mixed together in the theoretical or stoichiometric proportions necessary to form sodium aluminum fluoride according to the formula $Na_3AlF_6$. An excess of aluminum hydrate will materially increase the efficiency of the reaction but, for reasons which will later appear, may not be desirable in amounts over 5%. If stoichiometric proportions of sodium fluoride and aluminum hydrate are digested together for a short period of time at the boiling temperature of the solution (about 100° C.), the reaction will proceed to about 25% completion. An increase of temperature to 150° C. tends to further promote the reaction, and at 165° C. it is about 60% complete; at 175° C. about 93% of the reagents are converted into sodium aluminum fluoride and sodium hydroxide. At 185° C. the reaction is 95% complete. It is readily apparent, therefore, that a temperature higher than 175°–180° C. is not necessary. However, higher temperatures can be employed and are within the scope of my invention, although under ordinary working conditions, the pressure increase caused by these higher temperatures is not desirable.

As above mentioned, the reaction is promoted by the use of an excess of aluminum hydrate. However, it has been found that the aluminum hydrate added in excess of the theoretical proportions, will remain in the final product as an impurity, and for this reason an excess of over 5% is not ordinarily desirable.

In the foregoing discussion, the reaction of sodium fluoride with aluminum hydrate has been described as being about 93% complete at 175° C. It was found, however, that because of the solubility of the sodium aluminum fluoride product in the other reaction product, sodium hydroxide, the actual yield of solid crystalline sodium aluminum fluoride amounted to only about 40% of the theoretical.

Regardless of this reduced yield of the final product because of the solubility of sodium aluminum fluoride in sodium hydoxide, the reaction, as above described, is commercially feasible and profitable since the sodium aluminum fluoride-sodium hydroxide solution may be filtered from the precipitated product and after suitable treatment returned to the process. However, I have found that such procedure is not necessary since the yield of the solid product may be considerably increased if the solvent action of the sodium hydroxide is substantially eliminated. This can be accomplished by adding to the solution a reagent which will neutralize the sodium hydroxide but will not otherwise unfavorably affect the reaction or the product. Examples of such reagents are hydrochloric acid, sulphuric acid, sulphur dioxide, sodium bicarbonate, and carbon dioxide. The choice of the reagent may be dependent upon the materials at hand and the by-product desired. For the present purpose, the use of carbon dioxide or its chemical equivalent is desirable, since the sodium carbonate formed by the reaction $$2NaOH + CO_2 = Na_2CO_3 + H_2O$$

may be recovered and used in the production of the sodium fluoride. The solution may be partially or completely saturated with carbon dioxide. Ordinarily satisfactory results may be obtained by adding sufficient carbon dioxide to convert the sodium hydroxide to sodium carbonate.

A mixture of sodium fluoride and aluminum hydrate which has been digested with water may give a conversion at 175° C., of 93% of the starting material, while the actual yield of the precipitated sodium aluminum fluoride will be only about 40%. However, on adding to this solution carbon dioxide or its equivalent, the actual yield of the precipitated sodium aluminum fluoride may be more than doubled. The sodium carbonate formed may be used in many of the known processes for producing the sodium fluoride or for other purposes.

At the lower temperatures, such as, for example 100° C., the reaction may be caused to proceed more nearly to completion by long periods of digestion, whereas at the preferred temperature the reaction is rapid and the materials need be digested but a short time in order to obtain a practically complete conversion of the sodium fluoride and aluminum hydrate into sodium aluminum fluoride.

As an example of my invention 100 parts (by weight) of sodium fluoride and 32.5 parts of aluminum hydrate were added to 2000 parts of water and digested ½ hour at 175° C. At the end of this time the reaction was 94% complete and 41.4% of the theoretically obtainable amount of sodium aluminum fluoride had been precipitated. The temperature of this solution was lowered to 165° C. and carbon dioxide was added until the solution was saturated. Under these conditions the reaction was 94% complete and the yield of precipitated sodium aluminum fluoride was 93.8% of the theoretical value calculated on the basis of the sodium fluoride. The solid product had the following analysis:

| $H_2O$ | $SiO_2$ | $Na_2SO_4$ | $Na_2CO_3$ | Sodium-aluminum fluoride | $Al_2O_3$ |
|---|---|---|---|---|---|
| 1.32% | 0.62% | 0.32% | 2.79% | 93.75% | 2.31% |

By the term "aluminum hydrate" I mean the chemical compounds which are often designated as the hydroxides and which are more accurately designated as the hydrated oxides of aluminum, irrespective of the actual degree of hydration.

I claim:

1. The process of making sodium aluminum fluoride comprising digesting together sodium fluoride and aluminum hydrate at temperatures above 75° C.

2. The process of making sodium aluminum fluoride comprising digesting together sodium fluoride and aluminum hydrate at a temperature of approximately 175° C.

3. The process of making sodium aluminum fluoride comprising digesting together sodium fluoride and aluminum hydrate at temperatures above 75° C. and eliminating the caustic alkali formed.

4. The process of making sodium aluminum fluoride comprising digesting together sodium fluoride and aluminum hydrate at a temperature of approximately 175° C. and eliminating the caustic alkali formed.

5. The process of making sodium aluminum fluoride comprising digesting together sodium fluoride and aluminum hydrate, neutralizing the caustic alkali formed to increase the yield of the solid sodium aluminum fluoride and separating the solid sodium aluminum fluoride from the solution.

6. The process of making sodium aluminum fluoride comprising digesting together sodium fluoride and aluminum hydrate at temperatures above 75° C., neutralizing the caustic alkali formed and separating the solid sodium aluminum fluoride from the solution.

7. The process of making sodium aluminum fluoride comprising digesting together sodium fluoride and aluminum hydrate, at a temperature of approximately 175° C., neutralizing the caustic alkali formed and separating the solid sodium aluminum fluoride from the solution.

8. The process of making sodium aluminum fluoride comprising digesting together sodium fluoride and aluminum hydrate, converting the caustic alkali formed to a carbonate and separating the sodium aluminum fluoride from the solution.

9. The process of making sodium aluminum fluoride comprising digesting together sodium fluoride and aluminum hydrate at temperatures above 75° C., converting the caustic alkali formed to a carbonate and separating the precipitated product from the solution.

10. The process of making sodium aluminum fluoride comprising digesting together sodium fluoride and aluminum hydrate at a temperature of approximately 175° C., converting the caustic alkali formed to a carbonate and separating the precipitated product from the solution.

11. The process of making a sodium aluminum fluoride comprising digesting together sodium fluoride and aluminum hydrate at temperatures above 75° C., said hydrate being in excess of the stoichiometric proportion required to convert the sodium fluoride into $Na_3AlF_6$.

12. The process of making a sodium aluminum fluoride comprising digesting together sodium fluoride and aluminum hydrate at a temperature of approximately 175° C., said hydrate being in excess of the stoichiometric proportion required to convert the sodium fluoride into $Na_3AlF_6$.

13. The process of making a sodium aluminum fluoride comprising digesting together sodium fluoride and aluminum hydrate, said hydrate being in excess of the stoichiometric proportion required to convert the sodium fluoride into $Na_3AlF_6$ so as to increase the efficiency of the reaction, neutralizing the caustic alkali formed to increase the yield of the solid sodium aluminum fluoride and separating the solid sodium aluminum fluoride and the excess aluminum hydrate from the solution.

14. The process of making a sodium aluminum fluoride comprising digesting together sodium fluoride and aluminum hydrate at temperatures above 75° C., said hydrate being in excess of the stoichiometric proportion required to convert the sodium fluoride into $Na_3AlF_6$, neutralizing the caustic alkali formed and separating the solid sodium aluminum fluoride and the excess aluminum hydrate from the solution.

15. The process of making a sodium aluminum fluoride comprising digesting together sodium fluoride and aluminum hydrate at a temperature of approximately 175° C., said hydrate being in excess of the stoichiometric proportion required to convert the sodium fluoride into $Na_3AlF_6$, neutralizing the caustic alkali formed and separating the solid sodium aluminum fluoride and the excess aluminum hydrate from the solution.

In testimony whereof, I have hereunto affixed my signature.

JOHN E. MORROW.